United States Patent Office 3,443,954

Patented May 13, 1969

3,443,954

SILVER HALIDE PHOTOGRAPHIC MATERIAL CONTAINING 3-ACYLAMINO-PYRAZOLONE COUPLERS

Karl-Heinz Menzel, Vaihingen (Enz), and Erich Böckly, Leverkusen, Germany, assignors to Agfa Aktiengesellschaft, Leverkusen, Germany, a corporation of Germany No Drawing. Filed May 7, 1965, Ser. No. 454,197
Claims priority, application Germany, May 23, 1964, A 46,126
Int. Cl. G03c *7/34;* C07d *49/20*
U.S. Cl. 96—100 6 Claims

ABSTRACT OF THE DISCLOSURE 1-(3'-sulfo-4'-ethoxyphenyl)-3-acylamino-5-pyrazolones make unusually effective magenta color couplers for color development.

It is common practice to use for the production of magenta dye images by color development, pyrazolone couplers which react with the oxidation products of color-forming developers particularly p-phenylenediamine and derivatives thereof, to form magenta dyes. The known couplers, however, are of limited utility since the dyes obtained upon color-forming development have unsatisfactory absorption characteristics.

It is among the objects of the present invention to provide color photographic material containing new color couplers which yield upon reaction with the oxidation products of the color-forming developer, magenta azomethine dyes with satisfactory absorption characteristics.

We now have found that upon color-forming development excellent magenta dye images are obtained with photographic material containing color couplers of the following formula:

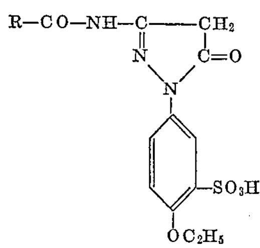

in which R is a saturated or olefinically unsaturated alkyl group having 8–20, preferably 15–18 C-atoms.

The azomethine dyes obtained by reaction of the above color couplers with the oxidation products of the color-forming developers are superior in their absorption characteristics to all the hitherto known alkali soluble derivatives of 3-acylaminopyrazolone and are therefore eminently suitable as magenta couplers for color photographic materials.

It is especially unexpected that only the compound with the ethoxy group in combination with the neighbouring sulfo group on the phenyl ring has such outstanding properties. The corresponding methoxy or phenoxy compound yield dyes with poor absorption characteristics. The same holds true with the corresponding propyl- and butyl-ethers. If the adjacent sulfo group is omitted and solubility in alkalies produced by introducing other substituents, for example by introducing the α-sulfopalmitic acid radical or the octadecylenesuccinic acid anhydride radical on the amino group, then the absorption of the corresponding azomethine dye is shifted too far towards the short wave region. Even when the sulfo group is replaced by a carboxyl group the same brilliancy of color is not achieved as with the color couplers according to the invention.

There thus remains the result that only a quite specific constitution is associated with an exceptionally good color coupling.

The color couplers having the foregoing formula produce the same dye obtained when a hydrogen atom of the methylene group of the color coupler is replaced by another sulfo group or by a halogen atom. The characteristic curve of the magenta dye image obtained upon color-forming developing with the latter couplers, is however, flatter.

The color couplers having the foregoing formula are added to the photographic layer, preferably the silver halide emulsion layer, in quantities of 15 to 100 g. per mol silver halide.

A light-sensitive silver halide layer in which the color couplers of the invention are to be incorporated can contain as the silver halide, silver chloride, silver bromide or mixtures thereof, if desired with a small amount of up to 10 mols percent of silver iodide.

Suitable binders for the light-sensitive layer include the usual water-permeable film-forming agents, especially gelatine. However, they may be partly or entirely replaced by products such as carboxymethyl cellulose, polyvinyl alcohol, polyvinyl pyrrolidone, alginic acid, starch or its derivatives, and the like.

Suitable color developers are the usual color-forming developers whose oxidation products react with the coupler to form a magneta dye, preferably developers which contain aromatic primary amino groups, and especially those of the p-phenylenediamine series.

EXAMPLE 1

*Preparation of the color coupler*

26.9 g. of 4-ethoxyphenylhydrazine sulfonic acid-(3) and 28 g. of sodium acetate sicc. are heated to 45° in a mixture of 300 cc. of methanol and 75 cc. of water. At this temperature, 22 g. of the iminoether hydrochloride of cyanic acid ethyl ester are introduced. The reaction mixture is cooled to 0° and stirred for one hour, a clear solution being formed. 20 g. of soda sicc. are added to this and heated to boiling for 20 minutes. The mixture is then cooled, filtered and the filtrate treated with 60 cc. of concentrated hydrochloric acid. After cooling, the precipitated reaction product is removed by suction filtration and washed with methanol. About 28 g. of 1-(3'-sulfo-4'-ethoxy)-phenyl-3-aminopyrazolone-(5) are obtained. 10 g. of this 3-aminopyrazolone are heated to 80° in 50 cc. of pyridine. At this temperature, 9 g. of stearic acid chloride are added dropwise and the mixture stirred for 2 hours at 70°. The reaction mixture is then introduced into a mixture of 500 g. of ice and 100 cc. of concentrated hydrochloric acid. The reaction product precipitates and is removed by suction filtration. The moist mass is then stirred with 100 cc. of dry acetonitrile and again filtered with suction. It is then boiled twice, each time with 50 cc. of acetonitrile, and again filtered with suction. 10 to 12 g. of 1-(3'-sulfo-4'-ethoxy)-phenyl-3-stearoylaminopyrazolone-(5) are obtained. M.P. 235–237°.

*Photographic application*

1.5 g. of the above color coupler are suspended in a small quantity of methanol. 3 cc. of a 1 N-sodium hydroxide solution are added and the suspension dissolved by the addition of 30 to 50 cc. of water. The clear solution is adjusted to pH with a 10% aqueous solution of citric acid or with dilute acetic acid, made up with 100 cc. of water and mixed with 100 cc. of a photographic silver halide gelatine emulsion.

The above emulsion mixture is applied onto a suitable sheet-like support of paper or of transparent film-forming polymers such as organic or inorganic cellulose ester, particularly cellulose acetate or a polyester such as polyethylene terephthalate. The resulting material is exposed to the object to be reproduced and developed on a color-forming developer of the following composition:

| | | |
|---|---|---|
| Calgon (a sodium hexametaphosphate-containing detergent as described, for example, on p. 953 of the Merck Index, 7th ed.) | grams | 2 |
| Sodium sulfite | do | 2 |
| Hydroxylamine sulfate | do | 0.8 |
| Potassium carbonate | do | 75 |
| N,N-diethyl-phenylenediamine sulfate | do | 2.75 |
| Water | liter | 1 |

After bleaching, fixing and drying according to the common practice a magenta image of excellent quality is obtained.

EXAMPLE 2

*Preparation of the color coupler*

15 g. of 1-(3'-sulfo-4'-ethoxy)-phenyl-3-amino-pyrazolone-(5) are heated to 80° in 75 cc. of pyridine. 12 g. of palmitic acid chloride are added dropwise. A clear solution is formed which is stirred for 2 hours at 80°. The product is worked up as in Example 1. About 17 g. of 1-(3'-sulfo-4'-ethoxy)-phenyl-3-palmitoyl-amino-pyrazolone-(5) are obtained. M.P. 230 to 232°.

A photographic material which obtains the above color coupler is produced as described in Example 1. Upon processing as described in the above example a magenta image with outstanding absorption characteristics is obtained.

EXAMPLE 3

*Preparation of the color coupler*

15 g. of 1-(3'-sulfo-4'-ethoxy)-phenyl-3-amino-pyrazolone-(5) are heated to 80° in 75 cc. of pyridine. 11 g. of myristic acid chloride are added dropwise and the mixture stirred for 2 hours at 80°. The product is worked up as in Example 1. About 15 g. of 1-(3'-sulfo-4'-ethoxy)-phenyl-3-myristoylaminopyrazolone-(5) are obtained. M.P. 240°.

A photographic material which containing the above color coupler is produced as described in Example 1. Upon processing as described in the above example a magenta image with outstanding absorption characteristics is obtained.

EXAMPLE 4

*Preparation of the color coupler*

15 g. of 1-(3'-sulfo-4'-ethoxy)-phenyl-3-amino-pyrazolone-(5) are heated to 80° in 75 cc. of pyridine. 13.5 g. of oleic acid chloride are added dropwise at this temperature and the mixture stirred for 2 hours at 80°. The solvent is distilled off in a water jet vacuum. The residue is taken up in 200 cc. of acetone and filtered from undissolved salt. The solution is concentrated by evaporation in vacuo. The residue is stirred three times cold with acetonitrile and removed by suction filtration. Finally, the residue is stirred with 200 cc. of ethyl acetate and isolated by suction filtration. Yield about 8 g. of 1-(3'-sulfo-4'-ethoxy)-phenyl-3-oleoyl-aminopyrazolone-(5). M.P. 135–140°.

A photographic material containing the above color coupler is produced as described in Example 1. Upon processing as described in the above example a magenta image with outstanding absorption characteristics is obtained.

We claim:

1. Light-sensitive photographic material comprising at least one supported silver halide emulsion layer, which contains an effective amount of a water-soluble and diffusion-resistant 3-acylaminopyrazolone coupler of the formula

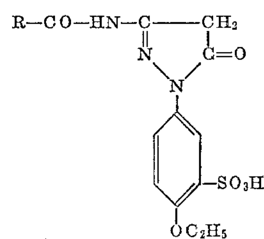

wherein

R represents a member of the group consisting of alkyl having between 8 and 20 carbon atoms and olefinically unsaturated alkyl having between 8 and 20 carbon atoms.

2. Light-sensitive material as defined in claim 1, wherein the substituent R of the 3-acylaminopyrazolone coupler contains between 15 and 18 carbon atoms.

3. Light-sensitive material as defined in claim 1, in which the color coupler has the formula

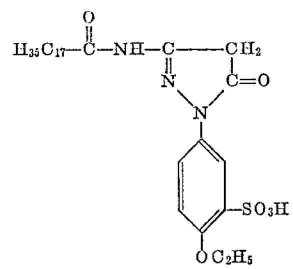

4. Light-sensitive material as defined in claim 1, in which the color coupler has the formula

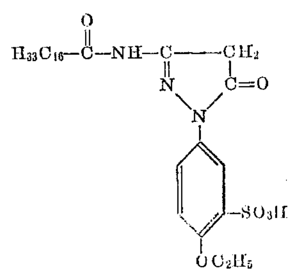

5. Light-sensitive material as defined in claim 1, in which the color coupler has the formula
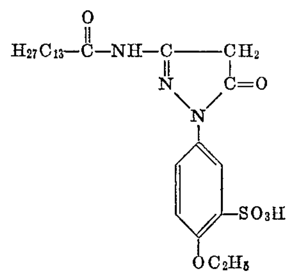
6. Light-sensitive material as defined in claim 1, in which the color coupler has the formula
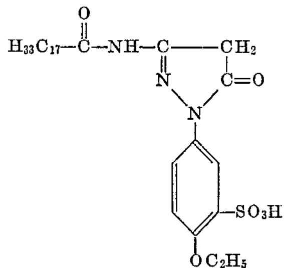
References Cited
UNITED STATES PATENTS
| | | | |
|---|---|---|---|
| 2,437,063 | 3/1948 | Zeh et al. | 96—100 |
| 2,829,975 | 4/1958 | Popeck et al. | 96—100 |
J. TRAVIS BROWN, *Primary Examiner.*
U.S. Cl. X.R.
260—310